US012755708B2

(12) United States Patent

Kim et al.

(10) Patent No.: US 12,755,708 B2
(45) Date of Patent: Oct. 6, 2026

(54) DISPLAY DRIVING CIRCUIT, DISPLAY DEVICE INCLUDING THE SAME AND ELECTRONIC DEVICE INCLUDING DISPLAY DEVICE

(71) Applicant: Samsung Display Co., LTD., Yongin-si (KR)

(72) Inventors: Wontae Kim, Yongin-si (KR); Jae-Han Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/304,045

(22) Filed: Aug. 19, 2025

(65) Prior Publication Data

US 2026/0073879 A1 Mar. 12, 2026

(30) Foreign Application Priority Data

Sep. 12, 2024 (KR) ........................ 10-2024-0124868

(51) Int. Cl.
*G09G 3/00* (2006.01)
*G09G 3/3275* (2016.01)

(52) U.S. Cl.
CPC ........... *G09G 3/3275* (2013.01); *G09G 3/006* (2013.01); *G09G 2310/08* (2013.01); *G09G 2330/08* (2013.01)

(58) Field of Classification Search
CPC .. G09G 3/3275; G09G 3/006; G09G 2310/08; G09G 2330/08; G09G 3/3233
See application file for complete search history.

(56) References Cited

U.S. PATENT DOCUMENTS

| | | | | |
|---|---|---|---|---|
| 2017/0004773 A1* | 1/2017 | Kim | ........................ | G09G 3/006 |
| 2021/0065595 A1* | 3/2021 | Nohtomi | ................ | G09G 3/006 |
| 2023/0116660 A1* | 4/2023 | Kim | ..................... | G09G 3/3291 345/76 |

FOREIGN PATENT DOCUMENTS

| | | | |
|---|---|---|---|
| KR | 101492694 | B1 | 2/2015 |
| KR | 102268521 | B1 | 6/2021 |
| KR | 102565299 | B1 | 8/2023 |
| KR | 1020230135217 | A | 9/2023 |

* cited by examiner

*Primary Examiner* — Antonio Xavier
(74) *Attorney, Agent, or Firm* — CANTOR COLBURN LLP

(57) ABSTRACT

A display device includes a pixel array including a plurality of pixels connected to a plurality of data lines; a timing controller which generates a reference voltage; and a data driver including a first sense amplifier which outputs a first measurement reference voltage corresponding to a first data line among the plurality of data lines, a second sense amplifier that outputs a second measurement reference voltage that is lower than the first measurement reference voltage in response to a second data line disposed next to the first data line, and a defect detection circuit which is connected to the second sense amplifier and generates a shutdown signal based on a comparison result between the input voltage received from the second sense amplifier and the reference voltage.

20 Claims, 8 Drawing Sheets

100

DISPLAY DRIVING CIRCUIT, DISPLAY DEVICE INCLUDING THE SAME AND ELECTRONIC DEVICE INCLUDING DISPLAY DEVICE

This application claims priority to Korean Patent Application No. 10-2024-0124868, filed on Sep. 12, 2024, and all the benefits accruing therefrom under 35 U.S.C. § 119, the content of which in its entirety is herein incorporated by reference.

BACKGROUND

(a) Field

The disclosure relates to a display driving circuit, a display device including the same and an electronic device including the display device, and an electronic device including the display device.

(b) Description of the Related Art

As an information society develops, demands for display devices that display images are increasing, and various types of display devices such as liquid crystal display devices, plasma display devices, and organic light-emitting display devices are being utilized.

The display device includes a display panel in which a plurality of gate lines, a plurality of data lines, and a plurality of pixels defined by intersections of the gate lines and the data lines are placed. The display device also includes various driving circuits such as a gate driving circuit and a data driving circuit for driving these gate lines, data lines, etc.

At this time, when a crack occurs in the display panel due to impact, a short circuit may occur between different signal wires arranged in the display panel, or a short circuit may occur between a signal wire and an electrode. In addition, these short circuits may cause screen defects, and there is a problem in that heat generation due to the short circuit may damage the display panel, the driving circuit, etc. However, there may be a drawback in that it takes a long time to detect whether the short circuit has occurred within the display panel.

SUMMARY

The disclosure is meant to provide a display device and a driving method of the display device that may detect defects in the display panel in real time.

A display device in an embodiment includes a pixel array including a plurality of pixels connected to a plurality of data lines; a timing controller which generates a reference voltage; and a data driver including a first sense amplifier that which outputs a first measurement reference voltage corresponding to a first data line among the plurality of data lines, a second sense amplifier which outputs a second measurement reference voltage that is lower than the first measurement reference voltage in response to a second data line disposed next (adjacent) to the first data line, and a defect detection circuit connected to the second sense amplifier and which generates a shutdown signal based on the comparison result between the input voltage received from the second sense amplifier and the reference voltage.

A display driving circuit in an embodiment includes a timing controller which generates a reference voltage, a first sense amplifier which outputs a first measurement reference voltage corresponding to a first data line among a plurality of data lines, a second sense amplifier which outputs a second measurement reference voltage that is lower than the first measurement reference voltage in response to a second data line disposed next (adjacent) to the first data line, and a defect detection circuit which is connected to the second sense amplifier and generates a shutdown signal based on a comparison result between an input voltage received from the second sense amplifier and the reference voltage.

BRIEF DESCRIPTION OF THE DRAWINGS

The above and other embodiments, advantages and features of this disclosure will become more apparent by describing in further detail embodiments thereof with reference to the accompanying drawings.

DETAILED DESCRIPTION

Figure 1:
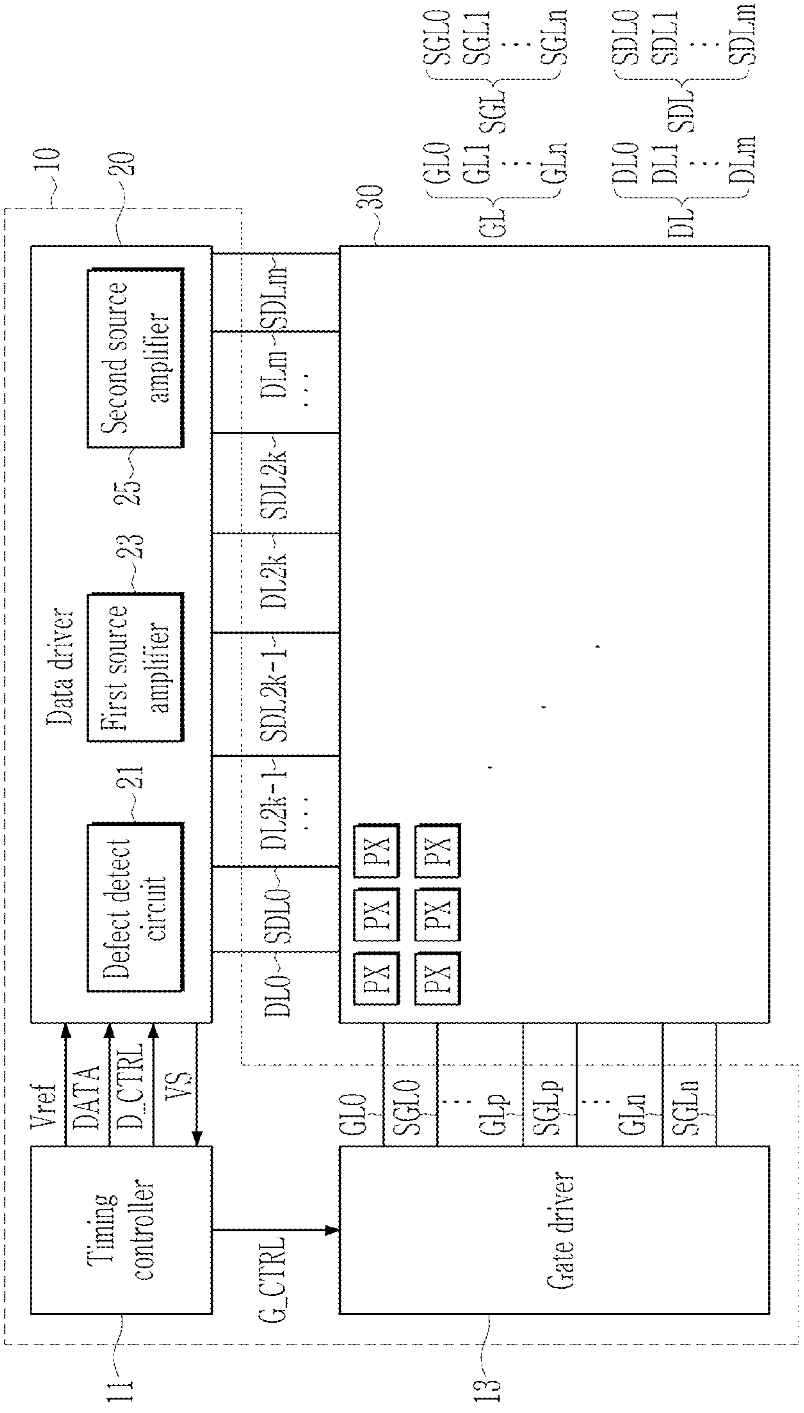
FIG. 1 is a block diagram showing an embodiment of a display device.

Embodiments of the disclosure will be described more fully hereinafter with reference to the accompanying drawings, in which embodiments of the disclosure are shown. As those skilled in the art would realize, the described embodiments may be modified in various different ways, all without departing from the spirit or scope of the disclosure.

Descriptions of parts not related to the disclosure are omitted, and like reference numerals designate like elements throughout the specification.

It will be understood that when an element is referred to as being “on” another element, it may be directly on the other element or intervening elements may be present therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

In addition, unless explicitly stated to the contrary, the word “comprise,” and variations such as “comprises” or “comprising,” should be understood to imply the inclusion of stated elements but not the exclusion of any other elements.

Furthermore, relative terms, such as “lower” or “bottom” and “upper” or “top,” may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," may therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" may, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram showing an embodiment of a display device.

A display device 100 may include a display driving circuit 10 and a display panel 30.

The display device 100 may perform a display operation and a panel defect detection operation.

The display operation may be an operation to display an image corresponding to an image signal received from a host. The panel defect detection operation may be an operation to detect whether a defect has occurred in the display panel 30.

In some embodiments, when the display device 100 performs the panel defect detection operation, the display device 100 may apply a plurality of measurement reference voltages to the display panel 30 and generate a shutdown signal VS in response to the application of the plurality of measurement reference voltages.

In an embodiment, the display device 100 may perform the panel defect detection operation during a vertical blank period when the display device 100 does not display the image, for example. In an embodiment, since the defects within the display panel 30 may occur over time, the display device 100 may measure whether the panel is defective at predetermined intervals to accurately display the image, for example. In an embodiment, the panel defect may be a short circuit between neighboring (adjacent) data lines within the display panel 30, an electroluminescent ("EL") short circuit, etc., for example.

The display device 100 may control the operation of the display device 100 based on the shutdown signal VS.

The display panel 30 may display an image to the user based on the image signal received from the host.

The display panel 30 may be one of the display devices that receives an electrically transmitted video signal and displays a two dimensional ("2D") image, such as a thin-film transistor liquid crystal display ("TFT-LCD"), an organic light-emitting diode ("OLED") display, a field emission display, or a plasma display panel ("PDP"). In some embodiments, there may be one or more display panels 30.

As shown in FIG. 1, the display panel 30 may include a plurality of signal lines, e.g., a plurality of gate lines GL, a plurality of data lines DL, a plurality of sensing control lines SGL, and a plurality of data sensing lines SDL. Additionally, the display panel 30 may include a plurality of pixels PX connected to the plurality of signal lines and arranged in a matrix format. The display panel 30 may display an image based on the data signal received from the data driver 20 and the gate driving signal received from the gate driver 13.

In FIG. 1, the pixel PX is illustrated as being connected to the plurality of gate lines GL, the plurality of data lines DL, the plurality of sensing control lines SGL, and the plurality of data sensing lines SDL, but the connection structure of the signal lines of the pixel PX of the display device according to the disclosure is not limited thereto. In an embodiment, various signal lines may be additionally connected corresponding to the circuit structure of the pixel PX, for example.

The display driving circuit 10 may generate a plurality of analog signals for driving the display panel 30 based on the image signals received from the host. In an embodiment, the plurality of analog signals may include a plurality of gate signals and a plurality of data signals DS that drive the plurality of pixels included within the display panel 30, for example. The display driving circuit 10 may provide the plurality of gate signals and the plurality of data signals DS to the plurality of pixels. The display panel 30 may emit image light corresponding to the image signal by the signal provided by the display driving circuit 10.

In some embodiments, the display driving circuit 10 may include a timing controller 11, a data driver 20, and a gate driver 13.

The timing controller 11 may control a driving timing of the display driving circuit 10. The timing controller 11 may perform various kinds of image processing such as changing the format of an image data and reducing power consumption on the image signal received from the host.

The timing controller 11 may generate a data control signal D_CTRL based on the image signal received from the host. The timing controller 11 may generate the image data DATA based on the image signal. The timing controller 11 may transmit the data control signal D_CTRL and the image data DATA to the data driver 20. Additionally, the timing controller 11 may generate a gate control signal G_CTRL. The timing controller 11 may transmit the gate control signal G_CTRL to the gate driver 13.

In some embodiments, the timing controller 11 may divide the image signal by one frame unit based on a vertical synchronization signal, and divide the image signal by a unit of the plurality of gate lines GL based on a horizontal synchronization signal to generate the image data DATA. The timing controller 11 may detect a porch period where a valid data signal is not generated based on a data enable signal. In an embodiment, the porch interval may be a period between a first active data period (i.e., the period where the image is displayed) where the valid data signal is output and a neighboring (adjacent) second active data period—i.e., a vertical back porch period (VBP in FIG. 5), for example. The timing controller 11 may also detect a period where the plurality of gate lines GL are not scanned—i.e., a horizontal porch period.

In some embodiments, the timing controller 11 may control the data driver 20 to output a measurement reference voltage to the display panel 30 to detect the fault in the display panel 30. In some embodiments, the timing controller 11 may have pre-stored a measurement reference voltage desired to perform the panel defect detection operation.

The timing controller 11 may receive the shutdown signal VS from the data driver 20. The shutdown signal VS may be a signal indicating whether the fault exists within the display panel 30. In some embodiments, the timing controller 11 may control the operation of the display device 100 based on the shutdown signal VS. In an embodiment, when the shutdown signal VS indicates that the fault exists in the display panel 30, the timing controller 11 may stop the operation of the display device 100, for example. In an embodiment, the timing controller 11 may transmit a signal to indicate to stop the power being supplied to the PMIC connected to the display device 100, for example.

The data driver 20 may receive the data control signal D_CTRL, the image data DATA, and the reference voltage Vref from the timing controller 11. In some embodiments, the data driver 20 may receive the image data DATA by a data unit corresponding to the plurality of pixels PX included in one horizontal line of the display panel 30. The image data DATA may include a grayscale information corresponding to each pixel PX. The data driver 20 may convert the image data DATA received from the timing controller 11 into a data signal DS in a form of an analog signal based on the plurality of gray voltages (or, gamma voltages) and the reference voltage Vref. The data driver 20 may output the plurality of data signals DS to the display panel 30 as a horizontal line unit via a plurality of data lines DL0-DLm (m is a natural number) according to the data control signal D_CTRL.

In some embodiments, the data driver 20 may apply a predetermined measurement reference voltage to the corresponding data line among the plurality of data lines DL to detect the fault in the display panel 30. In some embodiments, the data driver 20 may apply the predetermined reference measurement voltage as the data signal DS to the plurality of pixels PX via the plurality of data lines DL, and detect whether the display panel 30 is defective based on a signal (e.g., a current) received via the plurality of data lines DL.

As shown in FIG. 1, the data driver 20 may include a defect detection circuit 21, a first source amplifier 23, and a second source amplifier 25.

The first source amplifier 23 may be a source amplifier connected to the first data line (DL2*k*−1; where k is a natural number) among the plurality of data lines DL. The first source amplifier 23 may apply the first measurement reference voltage to the plurality of pixels PX. In some embodiments, the first measurement reference voltage may have a value greater than the reference voltage Vref.

The second source amplifier 25 may be a source amplifier connected to the second data line (DL2*k*; where k is a natural number) among the plurality of data lines DL. The second source amplifier 25 may apply a second measurement reference voltage to the plurality of pixels PX. In some embodiments, the second measurement reference voltage may have a value less than the reference voltage Vref.

The defect detection circuit 21 may be connected to the output terminal of the second source amplifier 25. The defect detection circuit 21 may compare the sensing voltage received in response to applying the first measurement reference voltage and the second measurement reference voltage to the plurality of pixels PX and the reference voltage Vref and generate a comparison result. The sensing voltage may vary based on the defect status of the display panel 30. The defect detection circuit 21 may detect the defect in the display panel 30 based on the comparison result. In some embodiments, when the defect is in the display panel 30, the comparison result may have a value higher than the reference voltage Vref. When there is no defect in the display panel 30, the comparison result may have a value less than the reference voltage Vref.

In some embodiments, the defect detection circuit 21 may determine that the defect exists in the display panel 30 when the comparison result has a value greater than the sum of the reference voltage Vref and the first threshold value. Here, the first threshold value may be preset based on the design of the display device 100 (e.g., the spacing between the plurality of pixels PX, the spacing between the plurality of data lines DL, the spacing between the source amplifiers, etc.).

In some embodiments, the defect detection circuit 21 may determine that the defect exists in the display panel 30 when the comparison result has a value less than the reference voltage Vref minus the second threshold value. Here, the second threshold value may be preset based on the design of the display device 100 (e.g., the spacing between the plurality of pixels PX, the spacing between the plurality of data lines DL, the spacing between the source amplifiers, etc.).

FIG. 1 illustrates that the data driver 20 is connected to the display panel 30 through the m data lines DL and the m data sensing lines SDL, but the disclosure is not limited thereto, and the display driving circuit 10 may include a different number of data sensing lines SDL than the number of data lines DL.

The data driver 20 may include a separate source amplifier for outputting the data signal DS corresponding to the image data DATA to the display panel 30, but the disclosure is not limited thereto, and the first source amplifier 23 and the second source amplifier 25 may be used to output the data signal DS corresponding to the image data DATA to the display panel 30.

The gate driver 13 may be connected to the plurality of gate lines GL of the display panel 30 and sequentially drive the plurality of gate lines GL of the display panel 30. The gate driver 13 may provide the plurality of gate signals to the plurality of gate lines GL of the display panel 30. The plurality of gate signals may be pulse signals having enable levels and disable levels.

The gate driver 13 may apply the plurality of gate signals to the plurality of gate lines GL in different ways based on the gate control signal G_CTRL of the timing controller 11. In an embodiment, when the enable level gate signal is applied to the pixel PX connected to one gate line among the plurality of gate lines GL, the data signal DS applied to the data line connected to the corresponding pixel PX among the plurality of data lines DL may be transmitted to the pixel PX, for example.

Figure 2:
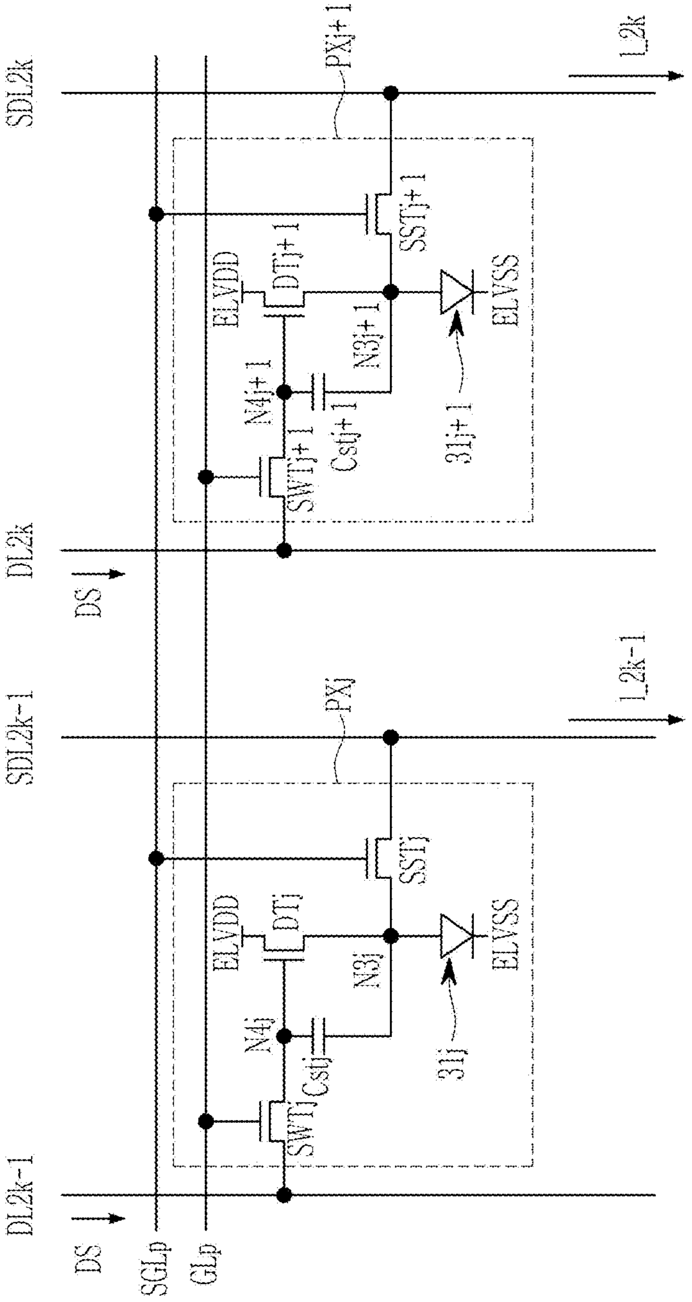
FIG. 2 is a circuit diagram of an embodiment of a pixel.

FIG. 2 is a circuit diagram of an embodiment of a pixel.

Specifically, the display panel (30 of FIG. 1) may include a plurality of pixels. FIG. 2 is a drawing showing the pixel PXj and the pixel PXj+1 disposed at arbitrary neighboring (adjacent) positions. As shown in FIG. 2, the pixel PXj may include a switching transistor SWTj, a driving transistor DTj, (an organic light-emitting diode ("OLED") 31*j*, a storage capacitor Cstj, and a sensing transistor SSTj. The switching transistor SWTj, the driving transistor DTj, the OLED 31*j*, the storage capacitor Cstj, and the sensing transistor SSTj may be one of a p-channel metal-oxide-semiconductor ("PMOS") transistor and an n-channel metal-oxide-semiconductor ("NMOS") transistor. FIG. 2 shows a case where all three transistors are NMOS transistors, but the disclosure is not limited to this.

The pixel PXj may be supplied with a first driving voltage ELVDD and a second driving voltage ELVSS. The first driving voltage ELVDD may be higher than the second driving voltage ELVSS.

The pixel PXj may be connected to a corresponding gate line GLp, a data line DL2*k*−1 (k is a natural number), a sensing control line SGLp, and a data sensing line SDL2*k*−1

(k is a natural number). In FIG. 2, the pixel PX is depicted as being connected to one data line DL2*k*−1 and one gate line GLp (p is a natural number), but the switching transistor SWTj may be connected to the gate line GLp and the data line DL2*k*−1. The switching transistor SWTj may be controlled by the gate voltage applied through the gate line GLp. The turned-on switching transistor SWTj may provide the data signal DS supplied through the data line DL2*k*−1 to the gate node N4*j* of the driving transistor DTj.

The sensing transistor SSTj may be connected to the sensing control line SGLp and the data sensing line SDL2*k*−1, and be controlled by the sensing voltage applied through the sensing control line SGLp. The turned-on sensing transistor SSTj may supply the initialization voltage I_2*k*−1 to the source node N3*j* of the driving transistor DTj. Additionally, the turned-on sensing transistor SSTj may transfer the voltage supplied to the source node N3*j* to the data sensing line SDL2*k*−1.

The storage capacitor Cstj may store the difference between the data voltage applied to the gate node N4*j* of the driving transistor DTj through the switching transistor SWTj and the initialization voltage supplied to the source node N3*j* of the driving transistor DTj through the sensing transistor SSTj, thereby supplying a constant driving voltage (e.g., a gate-source voltage of the driving transistor DTj) to the driving transistor DTj during a predetermined period, e.g., one frame.

The first driving voltage ELVDD may be applied to the drain node of the driving transistor DTj, and the driving transistor DTj may supply a current proportional to the driving voltage—that is, the difference between the voltage of the gate node N4*j* of the driving transistor DTj and the voltage of the source node N3*j*—to the OLED 31*j*.

The OLED 31*j* may include an anode connected to the source node N3*j* of the driving transistor DTj, a cathode to which the second driving voltage ELVSS is applied, and an organic light-emitting layer between the cathode and the anode. The cathode may be a common electrode shared by the plurality of pixels PX. When a driving current is supplied from the driving transistor DTj, light may be generated from the organic light-emitting layer of the OLED 31*j*. The intensity of light may be proportional to the driving current.

The description given with reference to the pixel PXj applies similarly to the pixel PXj+1 unless otherwise noted. In an embodiment, the pixel PXj+1 may include a driving transistor DTj+1, a sensing transistor SSTj+1, a switching transistor SWTj+1, a storage capacitor Cstj+1, an OLED 31*j*+1, a source node N3*j*+1 and a gate node N4*j*+1, for example. The turned-on sensing transistor SSTj+1 may supply the initialization voltage I_2*k* to the source node N3*j*+1 of the driving transistor DTj+1. Additionally, the turned-on sensing transistor SSTj+1 may transfer the voltage supplied to the source node N3*j*+1 to the data sensing line SDL2*k*.

In the display operation, the switching transistor SWTj may supply the data signal DS applied through the data line DL2*k*−1 to the driving transistor DTj. At this time, the sensing transistor SSTj may be turned on. A current proportional to the difference between the voltage of the gate node N4*j* of the driving transistor DTj and the voltage of the source node N3*j*—that is, the driving voltage—may flow to the OLED 31*j*. The OLED 31*j* may output light according to the driving current corresponding to the image data. Similarly, the OLED 31*j*+1 may also output light according to the driving current corresponding to the corresponding image data. During the panel defect detection operation, the data driver 20 may apply the measurement reference voltage as the data signal DS to the data line DL2*k*−1 and the data line DL2*k*.

Figure 3:
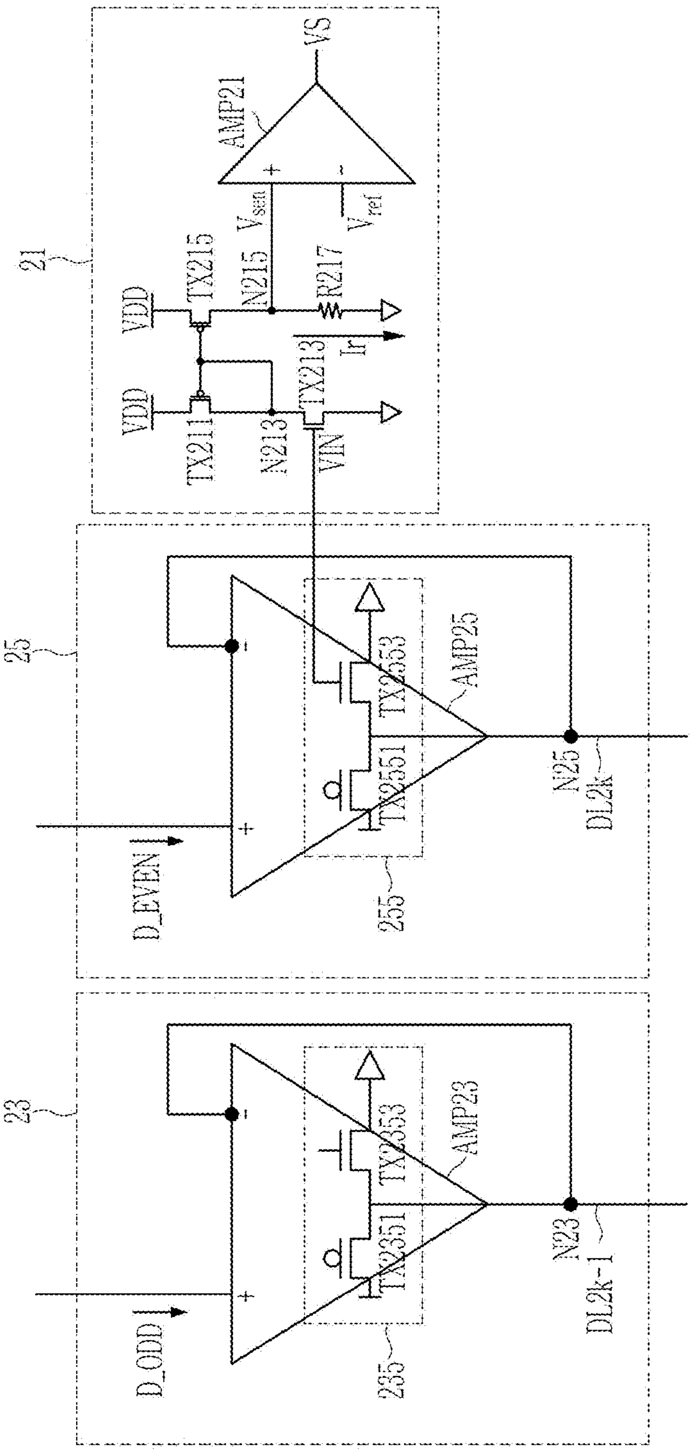
FIG. 3 is a block diagram showing an embodiment of a configuration of an embodiment of a data driver.
Figure 4:
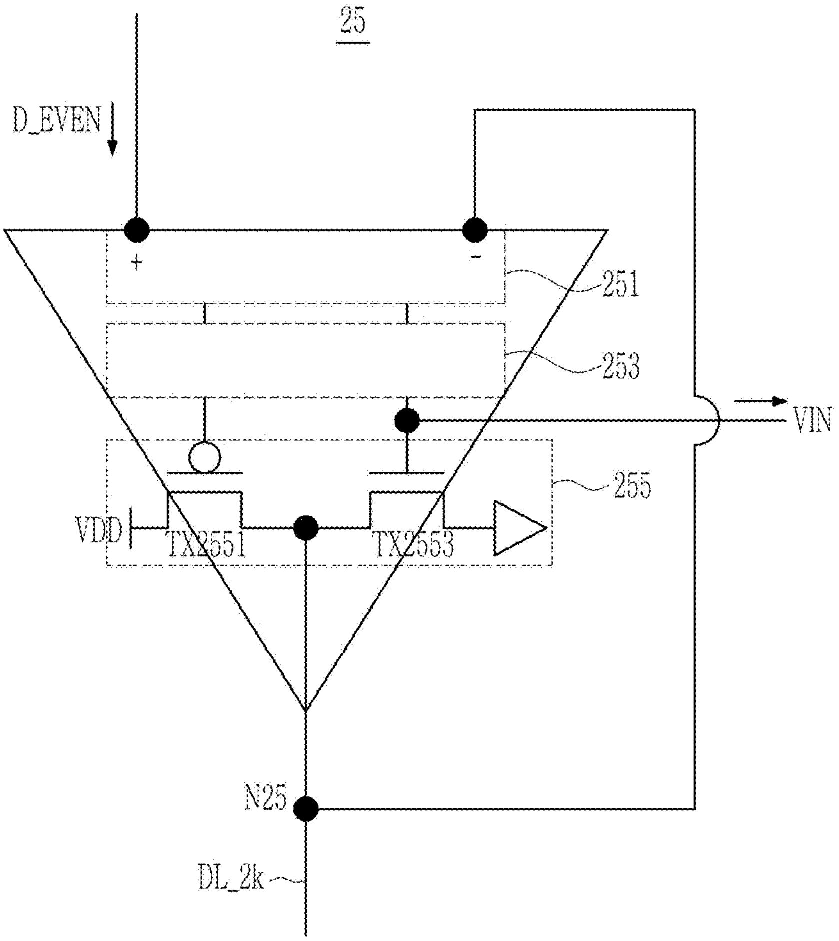
FIG. 4 is a drawing showing an embodiment of the configuration of a source amplifier.

FIG. 3 is a block diagram showing an embodiment of a configuration of a data driver. FIG. 4 is a drawing showing an embodiment of a configuration of a source amplifier.

The first source amplifier 23 may be a source amplifier connected to the data line DL2*k*−1. The first source amplifier 23 may include a first amplifier AMP23. The first amplifier AMP23 may include an input stage, an amplification stage, and an output stage 235. The output stage 235 may include a PMOS transistor TX2351 and an NMOS transistor TX2353. The first source amplifier 23 may receive a measurement reference voltage D_ODD higher than the reference voltage Vref as the data signal DS.

The second source amplifier 25 may be a source amplifier connected to the data line DL2*k*. The second source amplifier 25 may include a second amplifier AMP25.

Referring also to FIG. 4, the second source amplifier 25 may include an input stage 251, an amplification stage 253, and an output stage 255.

The input stage 251 may be connected to a first input terminal (+) and a second input terminal (−), and receive at least one gamma voltage through the first input terminal (+). In some embodiments, the first input terminal (+) may receive a reference measurement voltage. In some embodiments, the second input terminal (−) may be connected to the output terminal N25 through a feedback path. Similarly, in some embodiments, the second input terminal (−) of the first source amplifier 23 may be connected to the output terminal N23 through a feedback path.

The amplification stage 253 may operate as an amplification circuit that amplifies the voltage input through the input stage 251. In some embodiments, the amplification stage 253 may include a circuit to reduce a resistance component present between the input stage 251 and the output stage 255.

The output stage 255 may operate as a buffer circuit. The output stage 255 may be connected to one of the plurality of data lines DL connected to the display panel 30. A resistive element to offset the effects of static electricity may be connected between the output stage 255 and the display panel 30. In some embodiments, the output stage 255 may include an output buffer. The output buffer may include a PMOS transistor TX2551 and an NMOS transistor TX2553 coupled in series between a first power node VDD and a second power node. The output voltage may be output from the output terminal N25 between the PMOS transistor TX2551 and the NMOS transistor TX2553. In some embodiments, the output voltage may be a gray voltage input to the pixel PX of the display panel 30. In some embodiments, the output voltage may be a reference measurement voltage input to the pixel PX of the display panel 30.

As shown in FIGS. 3 and 4, the voltage input to the gate of the NMOS transistor TX2553 of the output stage 255 may be transmitted to the defect detection circuit 21 as an input voltage VIN.

While the configuration of the second source amplifier 25 is described with reference to FIG. 4, unless otherwise stated, the description of the second source amplifier 25 may also be applied to the first source amplifier 23.

The second source amplifier 25 may receive a lower voltage D_EVEN than the reference voltage Vref as the data signal DS.

The defect detection circuit 21 may include a current mirror circuit 211 and a third amplifier AMP21.

The current mirror circuit 211 may include a first PMOS transistor TX211, a second PMOS transistor TX215, an NMOS transistor TX213, and a first resistor R217.

The source of the first PMOS transistor TX211 may be connected to a power voltage (also referred to as a power supply voltage) VDD. The drain of the first PMOS transistor TX211 may be connected to the node N213—that is, the gate of the first PMOS transistor TX211 and the drain of the NMOS transistor TX213.

The source of the second PMOS transistor TX215 may be connected to the power voltage VDD. The drain of the second PMOS transistor TX215 may be connected to the node N215. One terminal of the first resistor R217 may be connected to the node N215, and a remaining (the other) terminal thereof may be connected to the ground. The node N215 may be connected to the first input terminal (+) of the third amplifier AMP21.

The gate of the NMOS transistor TX213 may be connected to the gate of the NMOS transistor TX2553 in the output stage 255 of the second source amplifier 25. The gate of the NMOS transistor TX213 may receive the voltage applied to the gate of the NMOS transistor TX2553 as the input voltage VIN. The source of the NMOS transistor TX213 may be connected to the ground.

The third amplifier AMP21 may receive the voltage of the node N215 as a sensing voltage Vsen through the first input terminal (+). The third amplifier AMP21 may receive the reference voltage Vref through the second input terminal (−). The third amplifier AMP21 may generate a shutdown signal VS based on the sensing voltage Vsen and the reference voltage Vref.

In some embodiments, as the input voltage VIN increases, the voltage applied to the gate of the NMOS transistor TX213 increases, so the voltage applied to the node N213 may decrease. That is, the voltage applied to the gates of the first PMOS transistor TX211 and the second PMOS transistor TX215 may be reduced. Accordingly, the voltage applied to the node N215 may increase. That is, the sensing voltage Vsen may increase. The third amplifier AMP21 may generate the shutdown signal VS based on the increased sensing voltage Vsen and the reference voltage Vref. In some embodiments, the shutdown signal VS may have a value greater than the reference voltage Vref. The shutdown signal VS having a value greater than the reference voltage Vref may be an enable level.

In some embodiments, when the input voltage VIN decreases, the voltage applied to the gate of the NMOS transistor TX213 decreases, so the voltage applied to the node N213 may increase. That is, the voltage applied to the gates of the first PMOS transistor TX211 and the second PMOS transistor TX215 may increase. Accordingly, the voltage applied to the node N215 may be reduced. That is, the sensing voltage Vsen may decrease. The third amplifier AMP21 may generate the shutdown signal VS based on the reduced sensing voltage Vsen and the reference voltage Vref. In some embodiments, the shutdown signal VS may have a value less than the reference voltage Vref. The shutdown signal VS with the value less than the reference voltage Vref may be a disable level.

Referring to FIG. 3 and FIG. 4, it is stated that the first sense amplifier 23 is connected to the data line DL2*k*−1 and the second sense amplifier 25 is connected to the data line DL2*k*, but the disclosure is not limited thereto and the first sense amplifier 23 may be connected to the data line DL2*k* and the second sense amplifier 25 may be connected to the data line DL2*k*−1. In this case, the defect detection circuit 21 may be connected to a sense amplifier that outputs the measurement reference voltage lower than the reference voltage Vref.

The defect detection circuit 21 may be connected to both the first sense amplifier 23 and the second sense amplifier 25. In this case, when the first sense amplifier 23 outputs the measurement reference voltage lower than the reference voltage Vref, the defect in the display panel 30 may be detected based on the shutdown signal VS output from the defect detection circuit 21 connected to the first sense amplifier 23. When the first sense amplifier 23 outputs the measurement reference voltage higher than the reference voltage Vref, the defect in the display panel 30 may be detected based on the shutdown signal VS output from the defect detection circuit 21 connected to the second sense amplifier 25.

Figure 5:
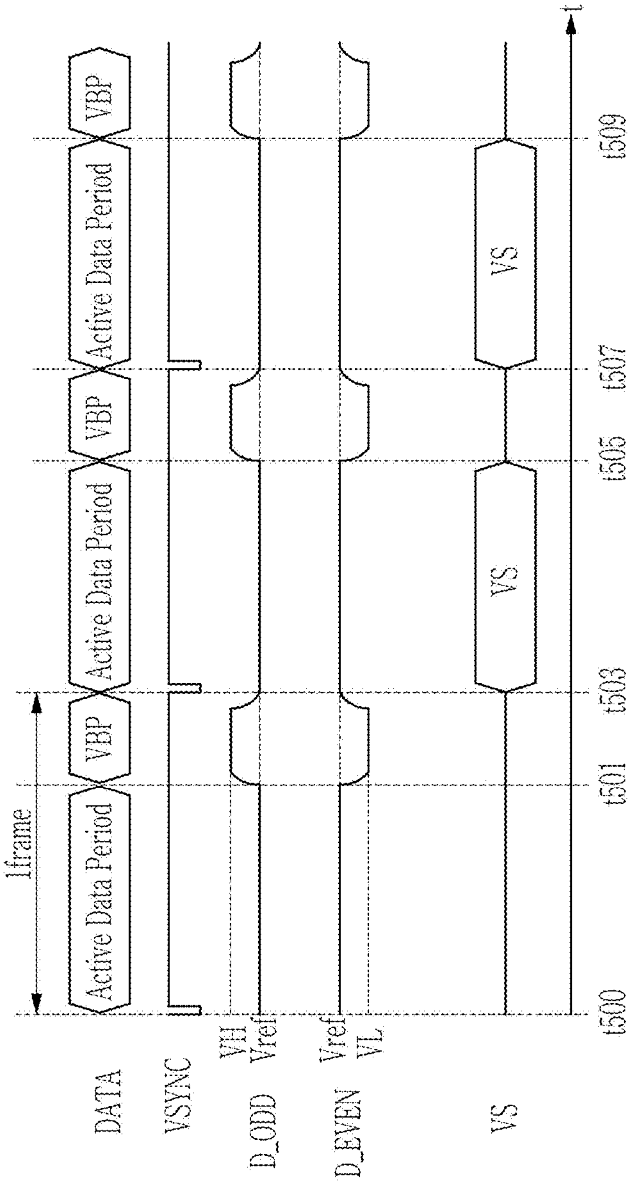
FIG. 5 is a diagram showing an embodiment of an operation of a display device.
Figure 6:
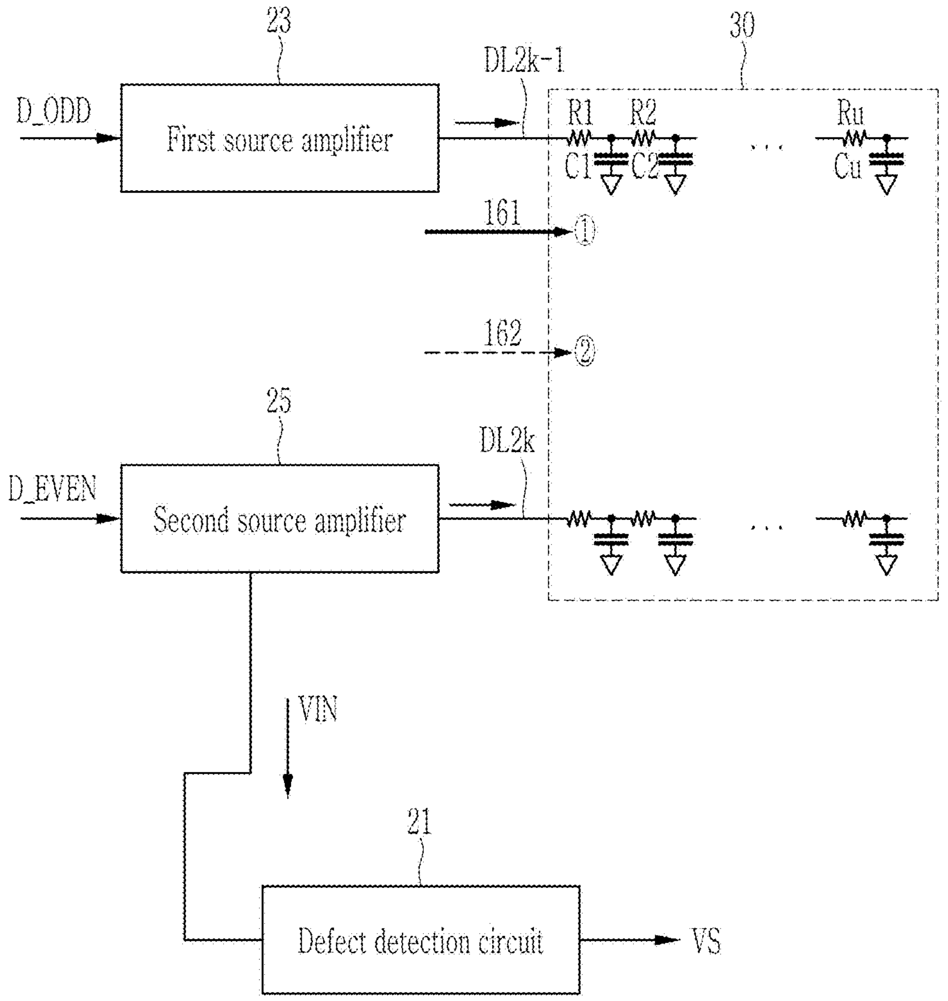
FIG. 6 is a diagram showing an embodiment of an operation of a data driver.
Figure 7:
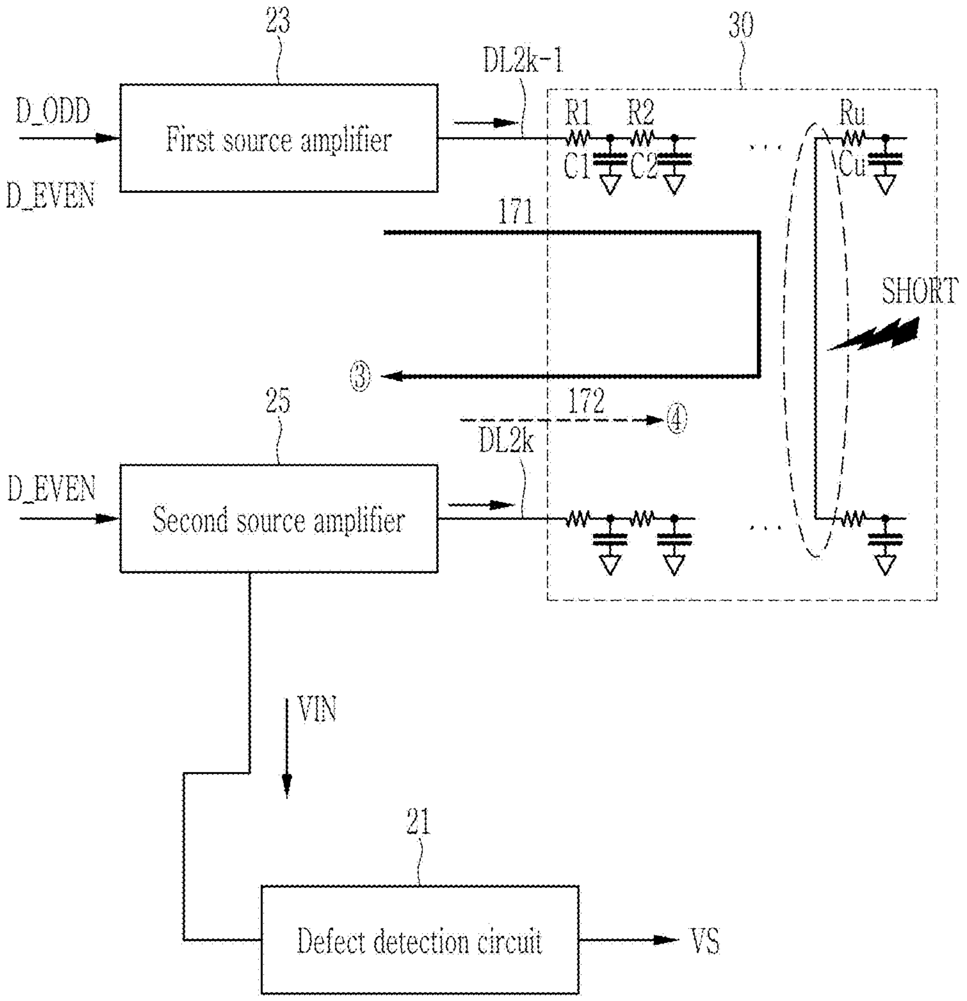
FIG. 7 is a diagram showing an embodiment of an operation of a data driver.

FIG. 5 is a diagram showing an embodiment of operation of a display device. FIG. 6 is a diagram showing an embodiment of operation of a data driver. FIG. 7 is a diagram showing an embodiment of operation of a data driver.

First, a vertical synchronization signal VSYNC may transition to a logic level "H."

The display device 100 may perform the display operation to display the image corresponding to the image data DATA during the active data period ACTIVE DATA PERIOD (between a time point t500 and a time point t501) within one frame period 1Frame.

In a period between a time point t501 and a time point t503, the display device 100 may not display the image during the vertical back porch period VBP.

In some embodiments, during the vertical back porch period VBP, the data driver 20 may perform the panel defect detection operation within the display panel 30. Specifically, the first source amplifier 23 and the second source amplifier 25 may output the measurement reference voltage desired for the defect detection operation to the display panel 30. The first source amplifier 23 may output the measurement reference voltage D_ODD to the corresponding data line. The second source amplifier 25 may output the measurement reference voltage D_EVEN to the corresponding data line. As shown in FIG. 5, the measurement reference voltage D_ODD of the first source amplifier 23 may have a first value VH that is greater than the reference voltage Vref. The measurement reference voltage D_EVEN of the second source amplifier 25 may have a second value VL that is less than the reference voltage Vref.

Referring also to FIG. 6, the display panel 30 may include a plurality of resistors R1, R2, . . . , Ru and a plurality of capacitors C1, C2, . . . , Cu, where u is a natural number. The plurality of resistors R1, R2, . . . , Ru and the plurality of capacitors C1, C2, . . . , Cu may be simplified representations of capacitors included in the plurality of pixels PX in the display panel 30 and resistors of wirings in the data lines DL. The RC delay time caused by the plurality of resistors R1, R2, . . . , Ru and the plurality of capacitors C1, C2, . . . , Cu may be within 1 frame period.

The first source amplifier 23 may output the measurement reference voltage D_ODD to the corresponding data line DL2*k*−1. The second source amplifier 25 may output the measurement reference voltage D_EVEN to the corresponding data line DL2*k*. The input voltage VIN may be delivered from the output terminal of the second source amplifier 25 to the defect detection circuit 21. The input voltage VIN may be generated by the first source amplifier 23 and the second source amplifier 25 applying the measurement reference voltage to the corresponding data lines.

In FIG. 6, the data line DL2*k*−1 and the data line DL2*k* may not be short circuited to each other. That is, there may be no defects within the display panel 30. A first current I61 may flow in a first direction 161 (①) through the data line DL2*k*−1 by the measurement reference voltage D_ODD applied from the first source amplifier 23. Additionally, a second current I62 may flow in a second direction 162 (②) on the data line DL2*k* by the measurement reference voltage D_EVEN output from the second source amplifier 25. Accordingly, the input voltage VIN output from the output stage of the second source amplifier 25 may be similar to the value of the measurement reference voltage D_EVEN.

Referring to FIG. 7, the data line DL2*k*−1 and the data line DL2*k* may be short circuited to each other. A first current I71 may flow through the data line DL2*k*−1 by the measurement reference voltage D_ODD applied from the first source amplifier 23. Since the measurement reference voltage D_ODD has the first value VH and the measurement reference voltage D_EVEN has the second value VL that is smaller than the first value VH, the first current I71 may flow in a third direction 171 (③). Additionally, a second current I72 may flow in a fourth direction 172 (④) on the data line DL2*k* by the measurement reference voltage D_EVEN output from the second source amplifier 25. Here, the third direction (③) may be the opposite direction of the fourth direction (④). That is, the first current I71 may flow toward the output stage of the second source amplifier 25. By the first current I71, the input voltage VIN output from the output stage of the second source amplifier 25 may have a value greater than the value of the measurement reference voltage D_EVEN.

Referring back to FIG. 5, at t503, the vertical synchronization signal VSYNC may transition to a logic level "L" and then to a logic level "H."

In t503-t505, the display device 100 may perform the display operation to display the image corresponding to the image data DATA. The defect detection circuit 21 may generate the shutdown signal VS based on the panel defect detection operation during t501-t503.

Specifically, the defect detection circuit 21 may generate the shutdown signal VS by comparing the input voltage VIN and the reference voltage Vref.

In the case of FIG. 6, the defect detection circuit 21 may compare the input voltage VIN which is similar to the value of the measurement reference voltage D_EVEN and the reference voltage Vref to generate the shutdown signal VS based on the comparison result. The shutdown signal VS may have a value less than the reference voltage Vref.

In the case of FIG. 7, the defect detection circuit 21 may compare the input voltage VIN, which is greater than the value of the measurement reference voltage D_EVEN, with the reference voltage Vref, to generate the shutdown signal VS based on the comparison result. The shutdown signal VS may have a value greater than the reference voltage Vref. The defect detection circuit 21 may transmit the shutdown signal VS to the timing controller 11. The timing controller 11 may stop operation of the display device 100 when it receives the shutdown signal VS with an enable level greater than the reference voltage Vref.

Although the defect detection circuit 21 in FIG. 5 is illustrated as generating the shutdown signal VS in t503 to t505, the disclosure is not limited thereto, and the defect detection circuit 21 may also generate the shutdown signal VS in t501-t503.

The description for a time period between a time point t501 and a time point t503 may be applied to a time period between a time point T505 and a time point t507. Also, the description for a time period between a time point t503 and a time point t505 may be applied to a time period between a time point t507 and a time point t509.

Figure 8:
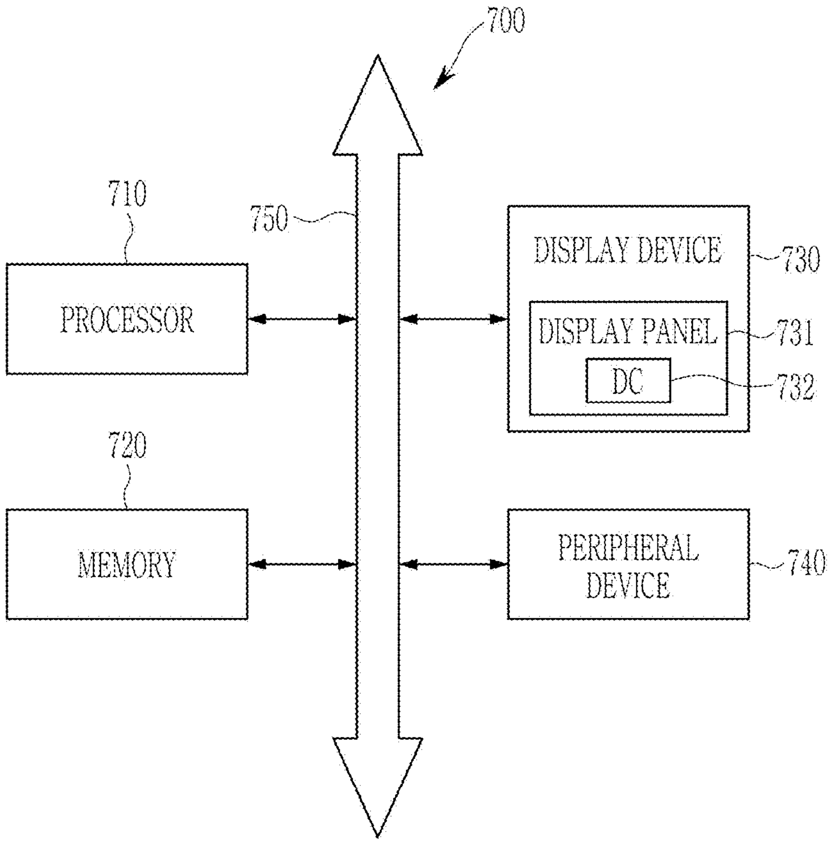
FIG. 8 is a diagram to explain an embodiment of a display system.

FIG. 8 is a diagram to explain an embodiment of a display system.

Referring to FIG. 8, a display system 700 in an embodiment may include a processor 710, a memory 720, a display device 730, and a peripheral device 740 electrically connected to a system bus 750.

The processor 710 controls the input/output of the data of the memory 720, the display device 730, and the peripheral device 740, and may perform the image processing on the image data transmitted between the corresponding devices.

The memory 720 may include a volatile memory, such as dynamic random-access memory ("DRAM"), and/or a non-volatile memory, such as flash memory. The memory 720 may consist of a DRAM, a phase-change random-access memory ("PRAM"), a magnetic random-access memory ("MRAM"), a resistive random-access memory ("Re-RAM"), a ferroelectric random-access memory ("FRAM"), a NOR flash memory, a NAND flash memory, and a fusion flash memory (e.g., a memory that combines a static random-access memory ("SRAM") buffer, a NAND flash memory, and a NOR interface logic). The memory 720 may store the image data acquired from the peripheral device 740 or the video signal processed by the processor 710.

The display device 730 includes a display panel 731 and may display the image data transmitted through the system bus 750 on the display panel 731. The display panel 731 may be a display panel. The display panel 731 may include a driving circuit (indicated as "DC" in FIG. 8) 732. The driving circuit 732 may apply different measurement reference voltages to the neighboring (adjacent) first data lines and second data lines among the plurality of data lines in the display panel 731, and may detect whether the display panel 731 has a defect based on the current flowing according to the application of the measurement reference voltage.

The peripheral device 740 may be a device such as a camera, scanner, webcam, etc. that converts a motion picture or a still image into an electrical signal. The image data acquired through the peripheral device 740 may be stored in the memory 720, or displayed on the display panel 731 in real time.

The display system 700 may be equipped in mobile electronic products such as smartphones, but is not limited thereto, and may be equipped in various types of electronic products that display images.

In some embodiments, each constituent element or the combination of two or more constituent elements described with reference to FIG. 1 to FIG. 7 may be implemented as a digital circuit, a programmable or non-programmable logic device or array, an application-specific integrated circuit ("ASIC"), or the like.

While this invention has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A display device comprising:

a pixel array including a plurality of pixels connected to a plurality of data lines;

a timing controller configured to generate a reference voltage; and a data driver including:

a first sense amplifier configured to output a first measurement reference voltage corresponding to a first data line among the plurality of data lines;

a second sense amplifier configured to output a second measurement reference voltage which is lower than the first measurement reference voltage in response to a second data line disposed next to the first data line, the second sense amplifier including a first input terminal configured to receive the second measurement reference voltage;

wherein the second measurement reference voltage is less than the reference voltage; and a defect detection circuit connected to the second sense amplifier and configured to generate a shutdown signal based on a comparison result between an input voltage received from the second sense amplifier and the reference voltage when the comparison result has a value less than the reference voltage.

2. The display device of claim 1, wherein:

the second sense amplifier further includes an output stage connected to the second data line, and a second input terminal connected to the output stage through a feedback path.

3. The display device of claim 2, wherein:

the output stage includes a first transistor of a first type, and a second transistor of a second type connected in series with the first transistor, and an output node between the first transistor and the second transistor is connected to the second data line.

4. The display device of claim 3, wherein:

the defect detection circuit is configured to receive a voltage input to a gate of the second transistor as the input voltage.

5. The display device of claim 4, wherein:

the defect detection circuit includes a current mirror circuit and a first amplifier, and the current mirror circuit includes a third transistor of the second type, which configured to receive the input voltage as a gate voltage and having a source connected to a power voltage, a fourth transistor of the first type connected in series to the third transistor, a fifth transistor of the first type, which has a common gate with the third transistor and a source connected to the power voltage, and a first resistor connected to a drain of the fifth transistor, and the first amplifier configured to generate the shutdown signal based on a sensing voltage of a node between the third transistor and the first resistor and the reference voltage.

6. The display device of claim 5, wherein:

the first type is a p-type, and the second type is an n-type.

7. The display device of claim 1, wherein:

the timing controller is configured to control an operation of the display device based on the shutdown signal.

8. The display device of claim 7, wherein: when the shutdown signal has a value greater than the reference voltage, the timing controller is configured to stop the operation of the display device.

9. The display device of claim 7, wherein:

in a state in which the shutdown signal is greater than a value obtained by adding the reference voltage to a predetermined first threshold value, the timing controller stops the operation of the display device.

10. The display device of claim 1, wherein:

the plurality of data lines includes a plurality of first data lines and a plurality of second data lines, and the plurality of first data lines and the plurality of second data lines are arranged alternately.

11. The display device of claim 1, wherein:

the timing controller is configured to generate an image data, the data driver is configured to generate a data signal corresponding to the image data, in a porch period between a display period where the data signal is output and a subsequent display period which is subsequent to the display period, the first sense amplifier configured to output the first measurement reference voltage, and the second sense amplifier configured to output the second measurement reference voltage.

12. A display driving circuit comprising:

a timing controller configured to generate a reference voltage, a first sense amplifier configured to output a first measurement reference voltage corresponding to a first data line among a plurality of data lines, a second sense amplifier configured to output a second measurement reference voltage which is lower than the first measurement reference voltage in response to a second data line disposed next to the first data line, the second sense amplifier including a first input terminal configured to receive the second measurement reference voltage;

wherein the second measurement reference voltage is less than the reference voltage, and a defect detection circuit connected to the second sense amplifier and configured to generate a shutdown signal based on a comparison result between an input voltage received from the second sense amplifier and the reference voltage when the comparison result has a value less than the reference voltage.

13. The display driving circuit of claim 12, wherein:

the second sense amplifier further includes an output stage connected to the second data line, and a second input terminal connected to the output stage through a feedback path.

14. The display driving circuit of claim 13, wherein:

the output stage includes a first transistor of a first type and a second transistor of a second type connected in series with the first transistor, and an output node between the first transistor and the second transistor is connected to the second data line.

15. The display driving circuit of claim 14, wherein:

the defect detection circuit is configured to receive a voltage input to a gate of the second transistor as the input voltage.

16. The display driving circuit of claim 15, wherein:

the defect detection circuit includes a current mirror circuit and a first amplifier, and the current mirror circuit includes a third transistor of the second type, which configured to receive the input voltage as a gate voltage and having a source connected to a power voltage, a fourth transistor of the first type connected in series to the third transistor, a fifth transistor of the first type, which has a common gate with the third transistor and a source connected to the power voltage, and a first resistor connected to a drain of the fifth transistor, and the first amplifier configured to generate the shutdown signal based on a sensing voltage of a node between the third transistor and the first resistor and the reference voltage.

17. The display driving circuit of claim 12, wherein:

the timing controller is configured to control an operation of a display device based on the shutdown signal.

18. The display driving circuit of claim 17, wherein: in a state in which the shutdown signal has a value greater than the reference voltage, the timing controller is configured to stop the operation of the display device.

19. The display driving circuit of claim 12, wherein:

the plurality of data lines includes a plurality of first data lines and a plurality of second data lines, and the plurality of first data lines and the plurality of second data lines are arranged alternately.

20. An electronic device comprising:

a memory configured to store an image data;

a processor configured to control an input/output of a data of the memory;

a display device configured to display the image data, the display device comprising:

a pixel array including a plurality of pixels connected to a plurality of data lines;

a timing controller configured to generate a reference voltage; and a data driver including: a first sense amplifier configured to output a first measurement reference voltage corresponding to a first data line among the plurality of data lines;

a second sense amplifier configured to output a second measurement reference voltage which is lower than the first measurement reference voltage in response to a second data line disposed next to the first data line, the second sense amplifier including a first input terminal configured to receive the second measurement reference voltage;

wherein the second measurement reference voltage is less than the reference voltage; and a defect detection circuit connected to the second sense amplifier and configured to generate a shutdown signal based on a comparison result between an input voltage received from the second sense amplifier and the reference voltage when the comparison result has a value less than the reference voltage.

* * * * *